United States Patent [19]

Canning et al.

[11] 3,986,992
[45] Oct. 19, 1976

[54] LOW SHRINK THERMOSETTING POLYESTERS

[75] Inventors: John L. Canning, Parma; Robert W. Lottig, N. Olmsted; both of Ohio

[73] Assignee: SCM Corporation, New York, N.Y.

[22] Filed: Apr. 16, 1975

[21] Appl. No.: 568,591

[52] U.S. Cl. .......................... 260/22 CB; 260/23 P; 260/40 R; 260/861; 260/862; 260/863
[51] Int. Cl.² .................................. C08L 67/08
[58] Field of Search ............... 260/22 CB, 862, 861, 260/863, 23 P

[56] References Cited
UNITED STATES PATENTS

| | | | |
|---|---|---|---|
| 2,973,331 | 2/1961 | Kraft | 260/22 M |
| 3,347,806 | 10/1967 | Zimmermann | 260/22 M |
| 3,549,586 | 12/1970 | Smith et al | 260/861 |
| 3,736,278 | 5/1973 | Wada et al | 260/861 |
| 3,883,612 | 5/1975 | Pratt et al | 260/862 |
| 3,923,927 | 12/1975 | Miyake et al | 260/862 |

Primary Examiner—Ronald W. Griffin
Attorney, Agent, or Firm—Thomas M. Schmitz

[57] ABSTRACT

This invention pertains to a one-component, low shrink molding resin system comprising a thermoplastic, branched alkyd in combination with a thermosetting dicyclopentadiene modified polyester resin. The low shrink molding resin systems are stabilized dispersions wherein the branched thermoplastic alkyd is dispersed within the dicyclopentadiene polyester resin (polyester polymer + monomer) to provide a uniform dispersion. The low shrink molding resin system can be thickened with alkaline earth and/or hydroxide thickeners suitable for use in low shrink molding compositions for producing low-profile molded parts.

4 Claims, No Drawings

LOW SHRINK THERMOSETTING POLYESTERS

BACKGROUND OF THE INVENTION

This application pertains to low shrink molding resin systems and relates to commonly assigned and allowed application identified as Ser. No. 330,474 filed February 8, 1973, now U.S. Pat. No. 3,883,612, issued May 13, 1975 and said application is incorporated herein by reference.

Unsaturated polyester polymers blended with vinyl monomers such as styrene are well-known molding resins that can be cured at room temperature or under heat and/or pressure to form a thermoset plastic molded part. These molding resins often are combined with inert fillers, glass fibers, glass flakes, talcs, and the like for the purpose of obtaining improved impact strength, flexural strength, and rigidity in molded parts. Most conventional thermosetting resins, however, characteristically shrink about 8% to 10% by volume and consequently distort during the molding process whereby the shrinkage thereof is unsatisfactory despite the many favorable inherent characteristics of polyester molding compositions. To offset the shrinkage characteristic, resin systems have been suggested based primarily on a resin system of a thermosetting polyester polymer, a thermoplastic addition polymer, and a reactive ethylenically unsaturated monomer.

A particularly desirable low shrink resin composition is a stabilized one-component system disclosed in Ser. No. 330,474 filed Feb. 8, 1973, and copending herewith which provides a dicyclopentadiene-modified polyester resin intermixed primarily with a modified acrylic thermoplastic polymer having acid functionality.

It now has been found that an improved low shrink thermosetting polyester resin system can be achieved by dispersing a thermoplastic, branched, fatty acid modified alkyd dispersed within a dicyclopentadiene-modified polyester resin to produce a stabilized, uniform dispersion mixture.

SUMMARY OF THE INVENTION

In accordance with this invention, the thermosetting low shrink molding resin composition comprises a branched, fatty acid modified thermoplastic alkyd polymer mixed with a dicyclopentadiene-modified unsaturated polyester polymer and a reactive monomer to provide a uniform stabilized resin dispersion mixture. The branched, fatty acid alkyd is a thermoplastic short oil alkyd containing by weight between about 4% to 20% saturated fatty acid and at least an equivalent molar amount of polyol to provide a branched alkyd polymer having a branching functionality greater than 2.

DETAILED DESCRIPTION OF THE INVENTION

The low shrink resin molding composition of this invention comprises a branched fatty acid modified alkyd polymer dispersed within a dicyclopentadiene-modified unsaturated polyester and a reactive copolymerizable monomer.

In accordance with this invention, the branched fatty acid modified thermoplastic alkyd polymers are copolymers of diols and minor amounts of polyols esterified with dicarboxylic acids and monocarboxylic saturated fatty acids to provide a branched alkyd containing between about 4% to 20% by weight fatty acid. The diols are conventional glycols and include for example ethylene glycol, propylene glycol, dipropylene glycol which can be combined with minor amounts of higher glycols such as 1,3 and 1,4 butylene glycol, 1,4 cyclohexanedimethanol. The polyols contain three or more reactive hydroxyl groups and include, for example, glycerol, pentaerythritol, dipentaerythritol, and trimethylol propane and trimethylol ethane. Trimethylol propane is the most preferred polyol due to the three primary alcohol groups which have equivalent reactivity as compared to glycerol which has a less reactive secondary polyol group. The triols can be combined with minor amounts of higher polyols provided that sufficient monocarboxylic fatty acid is used to terminate the polymer chain and avoid gellation. The most preferred polyols are trimethylol propane and trimethylol ethane and will comprise a major portion of the polyol. The average equivalent hydroxyl functionality of the diols and the polyols in the branched alkyd is greater than 2.0 and can be as high as 2.3 although the desired average equivalent hydroxyl functionality is between about 2.02 and 2.2. The preferred equivalents range is between about 2.04 and 2.16. The average hydroxyl equivalent functionality of the alkyd is figured on the basis that glycol equivalent functionality is 2.0 and that a triol hydroxyl equivalent functionality is 3.0. The equivalent hydroxyl functionality is figured empirically by assigning a hydroxyl functionality of 2 to glycol and 3 to triol and then figuring the average hydroxyl equivalency. For example, an alkyd containing 0.08 moles of triol such as trimethyl propane and 0.92 moles of diol such as propylene glycol is figured empirically to have 2.0 equivalents of linear polymerization and 0.08 equivalent of branching to produce an equivalent functionality of 2.08 and consequently a branched polymer. The polyol functionality is figured empirically since in practice a portion of the monocarboxylic acid esterifies a portion of the 0.08 equivalents of the triol but not all thus assuring a branched alkyd polymer.

In accordance with this invention, the diols and polyols are preferentially esterified with saturated dicarboxylic acids which include, for example, succinic acid, glutaric acid, adipic, acid, sebacic acid, pimelic acid, suberic acid, azelaic, and like saturated dicarboxylic acids having between about 4 to 10 carbon atoms wherein adipic, azelaic, and sebacic are the most common and are preferred. The diols and polyols are further esterified with monocarboxylic fatty acid which include, for example, lauric acid, palmitic acid, myristic acid and stearic acid. The branched alkyd contains by weight between about 4% to 20% monocarboxylic fatty acid being substantially free of conjugated double bonds and preferably substantially saturated monocarboxylic acids. The moles of monocarboxylic fatty acid are less than or equal to the moles of polyol to provide some branching which occurs even though equivalent molar amounts of monocarboxylic fatty acid are available since a portion thereof esterifies the glycol whereby the polyol such as a triol is esterified by dicarboxylic acid and thus provides polymer branching. Branching in the alkyd is produced by providing that the average polyol functionality is greater than 2 and preferably between about 2.02 and 2.2. Trimethylol propane and trimethylol ethane are preferred triols which have primary alcohol groups which tend to react at equivalent rates.

In practice, preferably all of the glycol and polyol requirements can be charged to the reactor and reacted together with the full acid charge except for the monocarboxylic acid which is added later in the cook after about 75% of the available dicarboxylic acid groups have been esterified. Thus, the polyol is first reacted with dicarboxylic acid to insure preferential reaction and branching with the triol. In contrast, a conventional alkyd derived from an equivalent oil such as coconut oil produces alkyds having a wide molecular weight range which tends to provide an unstable mixture upon being mixed with the DCP-polyester. Substantially uniform molecular weight distribution is particularly desirable to produce a stabilized uniform dispersion with the dicyclopentadiene modified unsaturated polyester. Preferentially reacting dicarboxyl groups prior to reacting the monocarboxylic acid, produces a polymer having a relatively uniform molecular weight distribution due to the degree of branching which is reasonably uniformly produced by preferential reaction with the primary hydroxyls on the polyol. Although not intending to be bound by theory, it is believed that the branched alkyd tends to solvate with styrene or vinyl toluene and similar monomer-solvents wherein swelling tends to occur in branched areas which are dissimilar to the non-branched areas when interacting with the monomer. It is believed that the branching in the alkyd tends to set up stresses or internal forces between the non-branched units whereupon negligible shrink occurs upon curing the unsaturated polyester system due to stress relieving and attendant microvoid development in the cured product. The branched alkyd of this invention interacts most efficiently with a dicyclopentadiene modified unsaturated polyester as hereafter set forth.

The branched, thermoplastic alkyd of this invention can be blended with dicyclopentadiene-modified polyester resin to produce an optically clear stabilized blend having no phase separation or visual incompatibility. The low shrink blend containing the fatty acid modified thermoplastic, branched alkyd was stable over extended periods of time of at least about 2 to 3 weeks. The stability of the alkyd of this invention in combination with the dicyclopentadiene modified unsaturated polyester is quite surprising in comparison with comparable alkyds such as soybean oil alkyd and/or dehydroacetic acid alkyd. Many of the conventional alkyds were either incompatible with unsaturated polyester and/or produced high-shrinkage on molded parts as will become more apparent in the examples.

Referring now to the dicyclopentadiene terminated unsaturated polyester polymer, the dicyclopentadiene terminated polyester polymer preferably comprises a copolymer of glycol, unsaturated dibasic acid, and about 0.1-0.4 mole of dicyclopentadiene per mole of unsaturated dibasic acid. Although all of the raw materials may be charged into the reaction vessel and reacted together at temperatures of 290°-310° F., it is preferred that the dicyclopentadiene be preferentially esterified with the unsaturated dibasic acid to minimize etherification with hydroxyl groups. At temperatures of about 308° F., etherification of dicyclopentadiene with hydroxyl groups is a competing reaction to esterification of dicyclopentadiene with carboxyl groups. Hence, preferably only a portion of the glycol charge is reacted with a large molar excess of dibasic unsaturated acid to first form primarily an acid terminated glycol-dibasic acid partial polymer. Thereafter, dicyclopentadiene is charged to the reactor to form a dicyclopentadiene esterified polyester prepolymer.

The preferred dicyclopentadiene-terminated polyester prepolymer is prepared by first charging into the reactor 2 molar equivalents of dibasic unsaturated acid per molar equivalent of glycol. The glycol and dibasic acid mixture is then heated and reacted at temperatures of about 290°-310° F. until substantially all of the glycol is esterified by the excess molar equivalent of unsaturated dibasic acids. Completion of the glycol esterification may be measured by the acid number of the reactants becoming essentially constant, thus indicating no additional hydroxyl groups are available for esterification. Thereafter, dicyclopentadiene is added to the reactor and reacted with the glycol-dibasic acid partial polymer at temperatures of less than 320° F., and preferably reaction temperatures of about 290°-310° F. After the dicyclopentadiene is completely charged to the reactor, the reactant mixture is maintained about 308° F. until the acid number of the reactants becomes essentially constant whereby the dicyclopentadiene is preferentially esterified with available terminal acid groups of the partial polymer. Thereafter, the remainder of the glycol charge may be added to the reactor whereupon the reaction is continued at temperatures of about 390° F. to complete the formation of a dicyclopentadiene-terminated polyester polymer.

The glycols that can be used in synthesizing the dicyclopentadiene-terminated polyester polymer of this invention are conventional glycols and polyols and include, for example: ethylene glycol, propylene glycol, diethylene glycol, dipropylene glycol, butanediol, hexanediol, pentaerythritol, triethylene glycol, trimethylol propane, glycerol, or mixtures thereof. Preferably, the glycols used in this invention are propylene glycol and/or dipropylene glycol as the major glycol component.

The unsaturated dibasic acid components in the dicyclopentadiene polyester are alpha,beta-unsaturated dicarboxylic acids or anhydrides and include, for example: maleic, fumaric, mesaconic, itaconic, citraconic, and the like or mixtures thereof. The anhydrides are preferred in the preparation of the dicyclopentadiene-esterified prepolymer. Similarly, unsaturated dicarboxylic acid may be reacted at 308° F. with the dicyclopentadiene and thereafter esterified with the full glycol requirement to produce a dicyclopentadiene-terminated polyester polymer. Although not preferred, lesser amounts of saturated dibasic acids or anhydrides may be introduced into the dicyclopentadiene polyester polymer to replace a portion of the unsaturated dicarboxylic acids. Conventional saturated dicarboxylic acids include, for example, orthophthalic anhydride or acid, terephthalic acid, isophthalic acid, adipic acid, sebacic acid, succinic acid, and the like acids or anhydrides. Similarly, minor amounts of multifunctional acid such as trimellitic anhdride can be incorporated into the dicyclopentadiene polyester backbone. The term dicarboxylic acid is intended to include dicarboxylic acid anhydrides.

Ethylenically unsaturated monomers copolymerizable with unsaturated polyester polymers are utilized to disperse or dissolve the dicyclopentadiene-terminated polyester polymer of this invention and form a dicyclopentadiene polyester resin mixture. Such ethylenically unsaturated monomers are well-known and include: styrene, methyl styrene, chlorostyrene, vinyl toluene, divinyl benzene, vinyl acetate, acrylic and methacrylic acid, lower alkyl esters of acrylic and methacrylic acid, diallyl phthalate and like unsaturated monomers or mixtures thereof. For reasons of efficiency and economy, the ethylenically unsaturated monomer most preferred in forming the low profile molding resin of this invention is styrene.

The foregoing stabilized resin dispersion desirably comprises by weight a mixture of at least about 25% of the dicyclopentadiene-terminated polyester polymer, about 5% to 20% of acid functional thermoplastic polymer, and about 30% to 60% of styrene or other ethylenically unsaturated monomer. The preferred resin mixture contains at least about 35 weight percent of said polyester, about 35% to 52% monomer, and about 10% to 17% of an acid functional thermoplastic, branched alkyd polymer having an acid number of between about 5 to 35. The ratios of the polyester, monomer and branched alkyd thermoplastic can be varied within the scope of this invention to provide a uniform and stabilized resin dispersion system as hereinbefore described.

The low shrink molding resin composition of this invention is suitable for mixing with additives known as chemical thickeners which are physically mixed into the resin mixture of dicyclopentadiene polyester polymer, ethylenically unsaturated monomer, and thermoplastic polymer. The chemical thickeners generally include Group II metal oxides, hydroxides, and alkoxides. The oxides and hydroxides of alkaline earths are preferred. For reasons of efficiency and economy, calcium oxide and magnesium oxide, or the respective hydroxides, are most often employed with low shrink molding compositions.

Catalysts and promoters often are incorporated in small amounts into thermosetting polyester resins containing ethylenically unsaturated monomer for curing the dicyclopentadiene polyester polymer and monomer mixed with the thermoplastic polymer. Typical catalysts, for example, include organic peroxides and peracids such as tertiary butyl perbenzoate, tertiary butyl peroctoate, benzoyl peroxide and the like. Examples of conventional promoters may be varied with the molding process and similarly varied with the level and types of inhibitors utilized, in a manner well-known in the art.

Fibers and fillers normally added to polyester molding resin compositions can be likewise used in formulating the molding composition of this invention. Examples include: glass fibers, chopped fibers, chalk, kaolin, asbestos, diatomaceous earth calcium carbonate, talc, ceramic spheres, and quartz.

The following examples are provided to illustrate the preferred embodiments of this invention and are not intended to restrict the scope thereof. All parts are parts by weight, all percentages are expressed as weight percentages, and all temperatures are in degrees Fahrenheit, unless otherwise expressly specified.

EXAMPLE 1

The following raw materials were reacted to produce a branched fatty acid alkyd having an equivalent hydroxy functionality of 2.08:
 3216 grams adipic acid
 2384 grams propylene glycol
 418 grams trimethylol propane
 246 grams stearic acid
 6.26 grams dibutyl tin oxide.
The propylene glycol, trimethylol propane, adipic acid and dibutyl tin oxide were charged to a reactor, upheated under $N_2$ blanket to about 310° F. whereupon water of reaction was drawn off. The reactant batch was increased in temperature gradually to 440° F. and held at 440° F. until an Acid No. of about 50 was reached indicating that about 90% of the dicarboxylic groups were esterified. The stearic acid was then charged lowering the batch temperatures to about 420° F. which was held until a Gardner-Holt viscosity of W-X was obtained at 60% NVM in styrene. The final Acid No. was 17. The polymer solid was thinned in inhibited styrene to provide a solution consisting of by weight about 50% branched alkyd polymer and 40% styrene which was mixed with the polyester of Example 2 to produce a low-shrink resin for molding low-profile parts.

EXAMPLE 2

A dicyclopentadiene modified polyester was synthesized from the following raw materials:
 9.9 gram moles of propylene glycol (752 grams)
 2.0 gram moles of dicyclopentadiene (264 grams)
 10.0 gram moles of maleic anhydride (980 grams)
Polymer synthesis was carried out in an ordinary reaction vessel suitable for batch processing of polyesters and including an agitator, heating means, condenser, and inert gas flow.

FIRST STEP

Formation of an acid terminated partial copolymer of propylene glycol-maleic ester was made by charging 5.0 gram moles of propylene glycol and 10.0 moles of maleic anhydride together with 3% xylene (based on the charge) into the reaction vessel and by heating under inert gas to 300° F. and holding at 300° F. for about 30 minutes until the acid number of the batch became constant. The acid number became constant at 412 whereupon the second step commenced.

SECOND STEP

A prepolymer was prepared by adding the 2.0 moles of the dicyclopentadiene to the propylene-maleic partial copolymer at a reaction temperature of 308° F. The 2.0 moles of dicyclopentadiene were mixed with 3% xylene and added to the reaction vessel at a steady and continuous rate for a time period of 30 minutes and the reaction then continued until the acid number of the batch leveled off at about 276.

THIRD STEP

A dicyclopentadiene-terminated polyester was prepared by charging the remaining 4.9 moles of propylene glycol to the foregoing prepolymer in the reaction vessel, together with 0.3 grams of hydroquinone. The batch temperature was gradually increased to about 390° F. and further processed until an acid number of 30 was reached. A test sample of 7 parts resin mixed with 3 parts styrene yielded a viscosity of 3,600 cps. at 77° F. Xylene and water of reaction were stripped from the batch.

FOURTH STEP

The dicyclopentadiene-polyester polymer was then cooled to 200° F., 0.5 grams of hydroquinone was added to the polymer which was then diluted with styrene to yield a dicyclopentadiene-polyester resin containing a ratio of 70 weight parts of dicyclopentadiene-polyester polymer and 30 weight parts of styrene monomer. Thereafter, about 1 gram ionol was added and the resin was discharged to a holding tank.

EXAMPLE 3

The resin composition of Example 1 was mixed at room temperature with the resin composition of Example 2 by charging to a mixing vessel the following:
20 weight parts of Example 1
64.3 weight parts of Example 2
15.7 weight parts of styrene.

The mixture was mildly agitated to form a uniform stabilized resin dispersion system contains about 43% by weight styrene. The resulting resin had a viscosity of 450 centipoises, a weight per gallon of 8.9, and SPI gel time of 2 minutes, an SPI reaction time of 3 minutes, and an SPI reaction time of 3 minutes, and an SPI peak exothermic of 440° F. with 1% BPO at 180° F.

EXAMPLE 4

A bulk molding compound was prepared by mixing together in a Baker-Perkins dough mixer the following materials (parts by weight):

| | |
|---|---|
| $CaCO_3$ | 53.0 |
| Zinc Stearate | 1.5 |
| Molding resin composition of Example 3 | 27.0 |
| t-Butyl Perbenzoate | 0.5 |
| ¼" Glass Strand | 20.0 |
| $Mg(OH)_2$ | 1.3 |

The calcium carbonate and zinc stearate were first dry blended in the mixer. Then the t-butyl perbenzoate catalyst was stirred into the liquid molding resin composition and that mixture slowly added to the material in the dough mixer while mixing continued. After thorough wetting of the calcium carbonate had been achieved, the chopped glass fiber reinforcement was added and mixing was continued for about 2 minutes until the glass had been thoroughly wetted. The magnesium hydroxide thickener was then added and mixing continued for about two more minutes. The mixing period after addition of the glass was kept as short as possible, consistent with achieving wetting of the glass and uniform dispersion of the glass and thickener, so as not to cause excessive breaking of the glass into shorter strands which would contribute less reinforcement to the molded articles to be produced from the bulk molding compound. The bulk molding compound was finally discharged from the mixer and held overnight (before molding) to insure that the thickening process was substantially complete.

EXAMPLE 5

A piece was molded in the following shape: about 9 inches square and ⅛ inch thick having on one of its surfaces: (1) a straight rib about ½ inch deep tapering from about 7-5/16 inches long and 9/16 inches wide at the base to about 7-3/16 inches long and ⅜ inches wide at its flat outer extremity, having rounded ends and with its longitudinal centerline about one inch from the edge of the nine-inch square; (2) an L-shaped rib about ½ inch deep with branches about one inch from the edges of the nine-inch square, the long branch being parallel to the straight rib (1) above and near the opposite edge of the square, the width tapering from about 5/16 inches at the base to about ¼ inch at its flat outer extremity and having round ends tapered at about the same angle as the straight rib (1) above; and three circular bosses centered at about 2 inch intervals along a line about 2½ inches from the edge of the square adjacent to the long branch of the L-shaped rib (2) above and being, respectively, (a) about ½ inch deep and tapering from about one inch in diameter at the base to about 15/16 inch at its flat extremity, and (c) about ¼ inch deep and tapering from about ⅝ inch diameter at the base to about 9/16 inch at its flat extremity, wherein all tapers were approximately flat except for 3 (c) in which the taper was more pronounced near the base and less pronounced near the extremity.

About 350 grams of the bulk molding compound from Example 4 was placed as a compact mass in the steel die which had been preheated to 295° F. on the cavity side and 285° F. on the plunger side, the die was quickly closed in a press, and held closed for two minutes. The press was then opened and the molded piece removed from the die.

EXAMPLE 6

Sheet molding compound was prepared by first mixing together, by successive additions in the order stated, the following materials (parts by weight):

| | |
|---|---|
| Molding resin composition of Example 3 | 100.0 |
| t-Butyl Perbenzoate | 2.0 |
| Zinc Stearate | 3.7 |
| $CaCO_3$ | 180.0 |
| $Mg(OH)_2$ | 5.0 |
| 1 inch hard glass strand | 96.9 |

The molding resin composition was introduced to a Cowles high speed mixer at about 1,000 rpm. The speed was gradually increased with successive additions so as to maintain a vortex but without excessive air entrainment, and the magnesium hydroxide thickener was not added until the previously added dry materials were thoroughly wetted and uniformly dispersed at which point the temperature was about 100° F. After addition of the magnesium hydroxide, stirring was continued for about 2 minutes. This mixture was then discharged and promptly (before excessive thickening, i.e. viscosity increase, had occurred) introduced into a Brenner SMC machine wherein it was spread onto two sheets of polyethylene film to a thickness of about 1/16 inch on each sheet, the one inch glass strands distributed over the exposed surface of one of these sheets and the exposed surfaces of the two sheets then brought together by passing between a pair of rollers. Thorough wetting of the glass was accomplished by then passing the laminated sheet between successive sets of ridged rollers to provide a kneading action. The sheet molding compound so produced was about ⅛ inch thick and was held about 5 days before molding so as to insure substantial completion of the thickening process.

EXAMPLE 7

A piece was molded in the molding die described in Example 5 from the sheet molding compound of Example 6 by folding a sheet of that material weighing about 375 grams into the die cavity which had been preheated to 300° F. on the cavity side and 290° F. on the plunger side. The die was quickly closed in a press, held closed for about two minutes with an applied pressure of about 1,000 lb/sq in. (i.e. about 81,000 lbs. total force) and then released, the die opened, and the piece removed.

EXAMPLE 8 a. A molded part of Example 7 was measured for "sink marks" at the three circular bosses which were particularly selected for exaggerated waviness. The molding of Example 7 produced an average deviation from the base line of 109 microinches which was measured by a Bendix Microcorder.

b. The molded part of Example 5 produced a deviation of 110 microinches.

c. A prior art resin (paraplex P-19C) was similarly compounded in the manner described in Examples 6 and as indicated in Example 7. The average deviation was 140 microinches.

d. A standard polyester of 1.1 moles of propylene glycol, 0.5 moles of maleic anhydride, 0.5 moles of phthalic anhydride was cooked to acid number of 30 and reduced to 65% N.V.M. in styrene. The resin was compounded similarly to composition of Example 6 and molded in the mold of Example 5 which produced a drastically deformed product. The same resin composition was molded in an ordinary 0.10 inch thickness flat sheet which produced deviation in excess of 1,000 microinches.

e. Ordinary 24 gauge sheet steel was measured and found to have an average deviation of 275 microinches.

f. A sheet molding composition compounded as indicated in Example 6 was molded into a flat sheet having a thickness of 0.10 inches which produces negligible deviations.

EXAMPLE 9

A dicyclopentadiene-modified polyester polymer was synthesized in a manner similar to Example 1 from the following raw materials:

5.4 gram moles of propylene glycol
4.0 gram moles of dipropylene glycol
3.0 gram moles of dicyclopentadiene
10.0 gram moles of maleic anhydride.

The dicyclopentadiene polyester was compounded with the branched alkyd thermoplastic in Example 1 and other components as indicated in Example 4. An excellent low-shrink molding composition resulted and produced low-profile molded parts.

EXAMPLE 10

A branched alkyd was produced in the manner indicated in Example 1 from the following raw materials.

3216 grams isophthalic acid
2384 grams dipropylene glycol
418 grams tall oil fatty acids
246 grams trimethylol propane
6.26 grams dibutyl tin oxide.

The raw materials (except for tall oil) were reacted in a first stage until at least about 75% of the dicarboxylic acid groups were reacted whereupon the tall oil was added and the esterification completed. The alkyd had a viscosity of W-Y at 60% NVM in styrene and an Acid No. of 14.

The alkyd of this example was mixed with the DCP-polyester of Example 9 together with addition styrene to provide a stabilized resin mixture by weight of 12% alkyd, 40% unsaturated DCP-polyester, and 48% styrene. Excellent low-profile molded parts were produced.

EXAMPLE 11

A branched alkyd similar to Example 1 was synthesized from the following raw materials.

0.92 moles propylene glycol
0.08 moles glycerol
1.00 moles of adipic acid
0.08 moles of stearic acid The propylene glycol, glycerol and adipic acid were charged to the reactor and reacted in the manner indicated in Example 1 until at least about 75% of the esterification reaction was completed whereupon the stearic acid was added and esterified. Esterification was continued until an Acid No. of 15 and a Gardner-Holt viscosity of W at 60% NVM in styrene. The alkyd was reduced in styrene as in Example 1.

This alkyd was mixed with the unsaturated polyester of Example 9 together with additional styrene to provide a low-shrink resin system comprising by weight about 12% alkyd polymer, 40% unsaturated polyester polymer, and 48% styrene monomer. The low-shrink resin system was tested in the manner set forth in the foregoing examples. The resin system produced very good low-profile parts.

The foregoing examples are intended to be illustrative of this invention but not limiting except as defined in the appended claims.

What is claimed:

1. In a low-profile molding resin composition for thickening with Group II metal oxides, hydroxides, or alkoxides, the resin system comprising by weight a mixture of (a) at least 25% of a dicyclopentadiene terminated ethylenically unsaturated polyester polymer being the esterification product of an alpha, beta-ethylenically unsaturated dicarboxylic acid, dicyclopentadiene, and glycol, said dicarboxylic acid esterified with about 0.1 to 0.4 moles of dicyclopentadiene per mole of dicarboxylic acid, said polyester produced by first reacting a molar excess of said dicarboxylic acid with said glycol to produce an acid terminated prepolymer and then reacting the dicyclopentadiene with said prepolymer, (b) about 5% to 20% of an acid functional thermoplastic polymer, and (c) about 30% to 60% of an ethylenically unsaturated monomer, the improvement comprising:

said thermoplastic polymer being a fatty acid modified branched, thermoplastic alkyd condensation polymer, said alkyd being the esterification product of glycol and minor amounts of polyol preferentially esterified with linear saturated dicarboxylic acids having between about 4 to 10 carbon atoms and monocarboxylic fatty acid, said alkyd containing between about 4% to 20% of said fatty acid by weight and having a hydroxyl equivalent branching functionality of between about 2.02 and 2.2.

2. The low-profile molding resin composition of claim 1 wherein the linear dicarboxylic acid is selected from adipic, azelaic, and sebacic acids.

3. The low-profile molding resin composition of claim 1 wherein the monocarboxylic fatty acid is selected from stearic, myristic, palmitic, and lauric acid.

4. The low-profile molding resin composition of claim 1 wherein the glycol and polyol are preferentially esterified with at least about 75% of the dicarboxylic acid requirements prior to esterification with the monocarboxylic acid.

* * * * *